United States Patent [19]

Tolley et al.

[11] 4,269,809

[45] May 26, 1981

[54] RECOVERY IN TITANIUM METAL VALUES BY SOLVENT EXTRACTION

[75] Inventors: William K. Tolley, Arlington Heights; William C. Laughlin, Schaumburg, both of Ill.

[73] Assignee: UOP Inc., Des Plaines, Ill.

[21] Appl. No.: 105,341

[22] Filed: Dec. 19, 1979

[51] Int. Cl.$^3$ ............................................ C01G 23/053
[52] U.S. Cl. ...................................... 423/70; 423/82; 423/81; 423/DIG. 14; 75/101 BE
[58] Field of Search .............. 423/70, DIG. 14, 658.5; 75/101 BE

[56] References Cited

U.S. PATENT DOCUMENTS

| | | | |
|---|---|---|---|
| 2,860,031 | 11/1958 | Grinstead | 423/DIG. 14 |
| 3,067,010 | 12/1962 | Long et al. | 423/70 |
| 3,104,950 | 9/1963 | Ellis | 423/70 |

FOREIGN PATENT DOCUMENTS 970885  9/1964  United Kingdom ...................... 423/70

*Primary Examiner*—Herbert T. Carter
*Attorney, Agent, or Firm*—James R. Hoatson, Jr.; Raymond H. Nelson; William H. Page, II

[57] ABSTRACT

Titanium metal values may be recovered from a titanium bearing source such as an ilmenite ore by subjecting the source to a reductive roast and leaching the reduced source with a halogen containing compound such as hydrochloric acid. The soluble titanium halide is then extracted from the leach liquor by utilizing an organophosphoric acid such as mono-2-ethylhexylphosphoric acid. The extracted titanium may then be stripped from the loaded organic acid solution by treating the solution with a mixture of hydrogen peroxide and an inorganic acid. Thereafter the desired titanium metal value may be recovered from the acid solution by any means known in the art such as hydrolysis.

6 Claims, No Drawings

RECOVERY IN TITANIUM METAL VALUES BY SOLVENT EXTRACTION

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

Heretofore in the prior art various methods have been utilized to recover titanium values from titanium bearing sources. For example, in U.S. Pat. No. 3,236,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as ferric oxide containing impurities in the spray roaster while the insoluble product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962, also reduces a titanium bearing ore at a high temperature to produce titanium sesquioxide which is in a form whereby it is easier to treat for a titanium-iron separation. Another prior art reference, U.S. Pat. No. 3,903,239 teaches a method for recovering titanium in which unroasted ilmenite is leached over a period of days at room temperature to recover about 80% of the titanium. Sulfur dioxide is added during the leaching to cause a precipitation of the ferrous chloride after which titanium dioxide is recovered by diluting and heating the solution.

This invention relates to a process for obtaining titanium metal values such as titanium dioxide. More specifically, the invention is concerned with a process for recovering economical yields of titanium metal values from a titanium bearing source such as an ilmenite ore, the utilization of the process of the present invention enabling the recovery to be effected in such a manner whereby the yield of the titanium metal values from relatively low grade ores being accomplished in an inexpensive manner.

It is therefore an object of this invention to provide an improved process for the recovery of titanium metal values.

A further object of this invention is to provide a hydrometallurgical process for obtaining yields of titanium metal values from titanium bearing sources such as ilmenite.

In one aspect an embodiment of this invention resides in a process for the recovery of titanium values from a hydrochloric acid leach liquor which comprises treating said leach liquor with an organophosphoric acid solution at treating conditions, stripping said titanium values from said acid solution by contact with a solution comprising a mixture of an inorganic acid and hydrogen peroxide, and recovering the desired titanium values.

A specific embodiment of this invention is found in a process for the recovery of titanium values from a hydrochloric acid leach liquor which comprises treating said leach liquor with mono-2-ethylhexylphosphoric acid at a temperature in the range of from about ambient to about 50° C. and atmospheric pressure, stripping the titanium values from said acid solution by contact with a solution comprising a mixture of sulfuric acid and hydrogen peroxide, heating said mixture of inorganic acid and hydrogen peroxide containing said titanium values to hydrolyze the titanium contained therein to form titanium dioxide, and recovering the resultant titanium dioxide.

Other objects and embodiments will be found in the following further detailed description of the present invention.

As hereinbefore set forth the present invention is concerned with a process for preparing readily obtainable rutile from a leach liquor containing soluble titanium halides. The process for obtaining the desired titanium metal values is effected by crushing an ore source such as ilmenite or other sources such as sand which contains the desired metals, chiefly titanium, as well as amounts of other metals such as iron, vanadium, chromium, manganese, etc., to a particle size which is less than about 35 mesh. Thereafter the crushed metal bearing source is subjected to a reductive roast at an elevated temperature which will range from about 600° to about 1000° C. or more and preferably in a range of from about 600° to about 900° C. in the presence of a reducing gas such as hydrogen, carbon monoxide, combinations of carbon monoxide and hydrogen, etc., or any other suitable reductant. The reductive roast is effected for a period of time ranging from about 0.5 up to about 2 hours or more. In the preferred embodiment of the invention, the reducing atmosphere which is used to accomplish the purpose of the roast usually comprises a mixture of about 50% carbon monoxide and 50% hydrogen with an excess of reductant being utilized in order to reduce a portion of the iron which is present in the system to the metal. It is also contemplated within the scope of this invention that the crushed ore may be, if so desired, subjected to an oxidation roast prior to the reductive roast, said oxidative roast being accomplished at a temperature in the range of from about 600° to about 900° C. in the presence of an oxidizing atmosphere which is provided for by the presence of air or oxygen. However, it is to be understood that this step is not a necessary part of the present invention. Following the reductive roast of the metal bearing source, the source is then subjected to an aqueous hydrogen halide leach which, in the preferred embodiment of the invention, comprises an aqueous hydrogen chloride leach although other hydrogen halides such as hydrogen bromide and hydrogen iodide may also be utilized although not necessarily with equivalent results. The aforesaid leach of the metal bearing source is usually effected at a temperature which may range from about ambient up to about 110° C., the preferred range being from about 80° to about 100° C., for a period of time ranging from about 0.25 hours up to about 1 hour or more in duration.

Following the leach of the metal bearing source which will form soluble iron halides and titanium halides such as ferrous chloride, titanium trichloride, etc., the mixture is subjected to a separation step in which the solid gangue is separated from the soluble metal chlorides and discarded. The separation of the solid gangue from the soluble metal chlorides may be effected in any suitable manner by means well known in the art, said means including decantation, filtration, etc.

The desired titanium dioxide in the form of rutile is obtained by treating the leach solution containing aqueous titanium trichloride with a solution which acts as a selective extractant for the titanium compound. The extraction of the titanium trichloride is effected at treating conditions which will include a temperature in the range of from about ambient (20°–25° C.) up to about 50° C. and at atmospheric pressure. The selective extractant which is utilized in the process of this invention will comprise an organophosphoric acid, the preferred acids comprising mono-2-ethylhexylphosphoric acid and di-2-ethylhexylphosphoric acid although it is also contemplated within the scope of this invention that other organophosphoric acids such as mono-ethylphosphoric, di-ethylphosphoric, mono-n-propylphosphoric, di-n-propylphosphoric, mono-isopropylphosphoric, di-isopropylphosphoric, mono-n-butylphosphoric, di-n-butylphosphoric, mono-t-butylphosphoric, di-t-butylphosphoric, mono-n-pentylphosphoric, di-n-pentylphosphoric, mono-sec-pentylphosphoric, di-sec-pentylphosphoric, etc., may also be used although not necessarily with equivalent results. The aforesaid organophosphoric acids may be utilized in an organic solvent such as benzene, toluene, the isomeric xylenes, kerosenes, etc. When utilizing a solvent, the organophosphoric acid is present in the solvent in an amount ranging from about 10% to about 50% by volume of the solvent.

Following the extraction of the titanium trichloride, the desired titanium values may be stripped from the loaded organic phase by treating this phase with a solution comprising a mixture of an inorganic acid and hydrogen peroxide. Examples of suitable inorganic acids which may be employed as a stripping agent along with the hydrogen peroxide will include sulfuric acid and nitric acid, said acid being present in an amount ranging from about 5 to about 50% by volume of the total mixture. In addition, the hydrogen peroxide will also be present in a relatively small amount ranging from about 1 about 10% by volume of the solution. The stripping of the titanium trichloride from the loaded organic phase is also accomplished at conditions similar to those utilized for the extraction of the titanium trichloride from the leach liquor, that is, temperatures ranging from about ambient to about 50° C. and atmospheric pressure.

The recovery of the desired titanium values in the form of rutile (titanium dioxide) may be accomplished by heating the inorganic acid solution containing the titanium trichloride to a temperature in the range of from about 100° to about 200° C. whereby the titanium chloride will be hydrolyzed to form the desired titanium dioxide. The formation of the titanium dioxide results in a precipitate which may then be readily separated from the inorganic acid-hydrogen peroxide solution and purified by conventional means such as washing, drying, etc., and the purified titanium dioxide recovered therefrom.

The process of the present invention may be effected in any suitable manner and may comprise either a batch or continuous type operation. For example, when a batch type operation is to be employed, the titanium bearing source which has been crushed to the desired particle size is placed in an apparatus such as an oven wherein it is roasted at a temperature within the range hereinbefore set forth while subjecting the ore to a reducing atmosphere which, as hereinbefore set forth, may comprise a mixture of carbon monoxide and hydrogen. Upon completion of the reductive roast the crushed ore is then placed in a second vessel wherein it is leached by contact with an aqueous hydrogen halide such as concentrated hydrochloric acid while maintaining the temperature in the range of from about 80° to 105° C. Upon completion of the desired leach the solid material such as gangue and/or insoluble metal compounds are separated from the pregnant leach liquor which is recovered and placed in a flask or such apparatus which is then cooled to the desirable operating temperatures hereinbefore set forth, that is, from ambient to about 50° C. The organophosphoric acid solution containing an organophosphoric acid of the type hereinbefore set forth dissolved in a suitable solvent is then added and the mixture is agitated for a predetermined period of time. Thereafter the organic phase after having been allowed to disengage is separated from the aqueous phase and treated with a mixture of an inorganic acid and hydrogen peroxide at similar operating conditions to those previously set forth. The mixture of inorganic acid, hydrogen peroxide and the titanium values which have been stripped from the organic phase are separated therefrom and subjected to a heat treatment whereby the titanium values will hydrolyze and form titanium dioxide, said titanium dioxide being in the form of a precipitate which is easily separable from the liquid phase. After separation from the liquid phase, the titanium dioxide may then be treated in any manner known in the art to purify the same and recovered.

In addition, it is also contemplated within the scope of this invention that a continuous manner of operation to obtain titanium dioxide may be employed. When such a type of operation is used, the crushed ore in the desired particle size is passed through an apparatus such as an oven at a predetermined rate of speed while being subjected to a reducing atmosphere, meanwhile maintaining the temperature of the oven in a range of from about 600° to about 1000° C. After completing the passage through the oven the reduced ore is continuously charged to a leaching zone wherein it is contacted with an aqueous leach solution comprising hydrogen chloride and after passage through the leaching zone the solution containing the soluble iron chlorides and titanium chlorides is separated from the solid gangue material. The pregnant leach liquor which contains the soluble titanium trichloride and soluble iron chloride is then charged to a zone wherein it is admixed with the extractant comprising a solution of an organophosphoric acid which will selectively extract the titanium trichloride from the leach liquor. The mixture of the leach liquor and extractant is continuously withdrawn from the zone and passed to a separator wherein the loaded organic phase is separated and continuously passed to yet another zone wherein it is admixed with the aqueous solution of an inorganic acid and hydrogen peroxide. After passage through this zone for a predetermined period of time, the effluent is continuously withdrawn and passed to a separation zone wherein the aqueous phase is separated from the stripped organic phase, the latter being recycled to the extraction zone for further use, while the aqueous phase is passed to a heating zone whereby the titanium value is hydrolyzed to form titanium dioxide. After formation of the titanium dioxide the effluent is continuously withdrawn and the titanium dioxide is purified and recovered in a manner hereinbefore set forth.

The following examples are given for purposes of illustrating the process of this invention. However, it is to be understood that these examples are given merely for purposes of illustration and that the present process is not necessarily limited thereto.

EXAMPLE I

A selective extraction solution was prepared by mixing 400 ml of mono-2-ethylhexylphosphoric acid with 400 ml of a kerosene sold under the tradename Kermac 470B by the Kerr-McGee Company. The extraction was effected by admixing 125 ml of a solution containing 23.5 grams/liter of titanium dissolved in hydrochloric acid and 250 ml of the selective extractant for a period of 5 minutes in a separatory funnel. After mixing the reactants for this period, the extractant mixture was allowed to disengage for a period of 15 minutes after which the organic phase was separated from the aqueous phase. Analysis showed that the final aqueous phase contained only 0.9 grams/liter of titanium. The organic phase was divided into 25 ml samples which were placed in separatory funnels.

To illustrate the stripping action of a stripping solution comprising a mixture of an inorganic acid and hydrogen peroxide, the 25 ml samples were subjected to treatment with various acids and bases. Each 25 ml sample was treated with 25 ml and shaken for 5 minutes. At the end of this period the phases were allowed to separate and the aqueous phases were analyzed to determine the titanium concentration which was stripped from the organic phase. The results of these tests are set forth in Table I below.

TABLE I

| Stripping Agent | Ti Conc. (G/L) | Remarks |
| --- | --- | --- |
| 50% (Vol) Nitric Acid | 0 | |
| 1 M Sulfuric Acid | 0 | |
| Ammonium Carbonate | Not Measured | Precipitated; vigorous gassing |
| Conc. Sulfuric Acid | 4.4 | Some gassing; very viscous |
| 2 M Ammonium Fluoride | 6.5 | Slow disengaging |
| 20% (Vol) Phosphoric Acid | 0.2 | Very slow disengaging |
| 3 M Hydrofluoric Acid | 6.5 | Slow disengaging |
| 50% Sulfuric Acid | 0.2 | |
| 1 M Sulfuric Acid Plus 1 ml Hydrogen Peroxide | 0.5 | |
| 50% Sulfuric Acid Plus 1 ml Hydrogen Peroxide | 0.5 | |

TABLE I-continued

Although concentrated sulfuric acid, ammonium fluoride and hydrofluoric acid gave a greater recovery of titanium, it was difficult to recover the titanium from these solutions. In contrast to this, the solutions of sulfuric acid containing hydrogen peroxide resulted in the obtention of titanium in the aqueous phase which was relatively easy to recover by heating the solution to hydrolyze the titanium and some titanium dioxide as a precipitate.

EXAMPLE II

In this example various concentrations of di-2-ethylhexylphosphoric acid in kerosene were prepared in which the acid was present in amounts of 10%, 20% and 50% by volume respectively. It was found that the 50% solution was clear in nature, the other two being cloudy. Each of the 50 ml solutions were mixed with 10 ml of a solution containing 28.0 grams/liter of titanium dissolved in hydrochloric acid and shaken for 10 minutes. At the end of this 10 minute period shaking was discontinued and the organic phase and aqueous phase were allowed to separate. Thereafter each of the organic solutions was stripped with 25 ml of various stripping agents, said stripping being accomplished during a period of 10 minutes followed by a period of time sufficient to allow the organic phase and the aqueous phase to separate. in the stripping action the 10% di-2-ethylhexylphosphoric acid solution was stripped with 5% by volume of sulfuric acid plus 1 ml of hydrogen peroxide. The 20% acid solution was stripped with ammonium chloride having a pH of 10.2 while the 50% acid solution was stripped with 50% sulfuric acid solution. The results of the extraction and stripping steps are set forth in the tables below.

TABLE II

| Extraction with Di-2-Ethylhexylphosphoric Acid | |
| --- | --- |
| Concentration of Di-2-Ethylhexylphosphoric Acid | Grams/Liter Titanium Remaining In Aqueous Hydrochloric Acid |
| 10% | 13.5 |
| 20% | 5.3 |
| 50% | 0.3 |

TABLE III

| Stripping With Various Agents | | |
| --- | --- | --- |
| Stripping Agent | Titanium Conc. Grams/Liter | Remarks |
| Sulfuric Acid Plus Hydrogen Peroxide | 5.7 | Maximum 5.8 g/l titanium possible |
| Ammonium Chloride | 0 | Precipitated |
| 50% Sulfuric Acid | 0 | Slow Disengaging |

It will be noted from the above tables that the stripping action utilizing a mixture of sulfuric acid and hydrogen peroxide resulted in an almost quantitative removal of titanium values from the organic extractant while the ammonium chloride and sulfuric acid alone did not strip any of the titanium from the organic phase. In addition, a further attempt to strip titanium from the 50% organic solution using a mixture of sulfuric acid and nitric acid recovered less than 0.1 grams/liter of titanium. It is therefore readily apparent that by utilizing the steps of selectively extracting titanium values from a hydrochloric acid solution using an organic solution of an organophosphoric acid followed by stripping of the organic phase with an agent comprising a mixture of an inorganic acid plus hydrogen peroxide will allow titanium values to be readily recovered from the hydrochloric acid solution.

We claim as our invention:

1. A process for the recovery of titanium values from a hydrochloric acid leach liquor containing titanium trichloride which comprises treating said leach liquor at a temperature of from about ambient to about 50° C. with a solution of mono- or di-2-ethylhexylphosphoric acid, contacting the resultant acid solution at a temperature of from about ambient to about 50° C., with an inorganic solution comprising a mixture of hydrogen peroxide and sulfuric or nitric acid to strip said titanium values from said acid solution, heating the resultant titanium-containing inorganic solution to a temperature of from about 100° to about 200° C. to hydrolyze titanium values to titanium dioxide precipitate, and separating said precipitate from the inorganic solution.

2. The process as set forth in claim 1 in which said first mentioned acid is mono-2-ethylhexylphosphoric acid.

3. The process as set forth in claim 1 in which said first mentioned acid is di-2-ethylhexylphosphoric acid.

4. The process as set forth in claim 1 in which said phosphoric acid is present in said solution in an amount in the range of from about 10% to about 50% by volume of said solution.

5. The process as set forth in claim 1 in which second mentioned acid is sulfuric acid.

6. The process as set forth in claim 1 in which second mentioned acid is nitric acid.

* * * * *